Dec. 28, 1943.    C. R. CRAIG    2,337,872
PROTECTIVE DEVICE
Filed Oct. 14, 1941
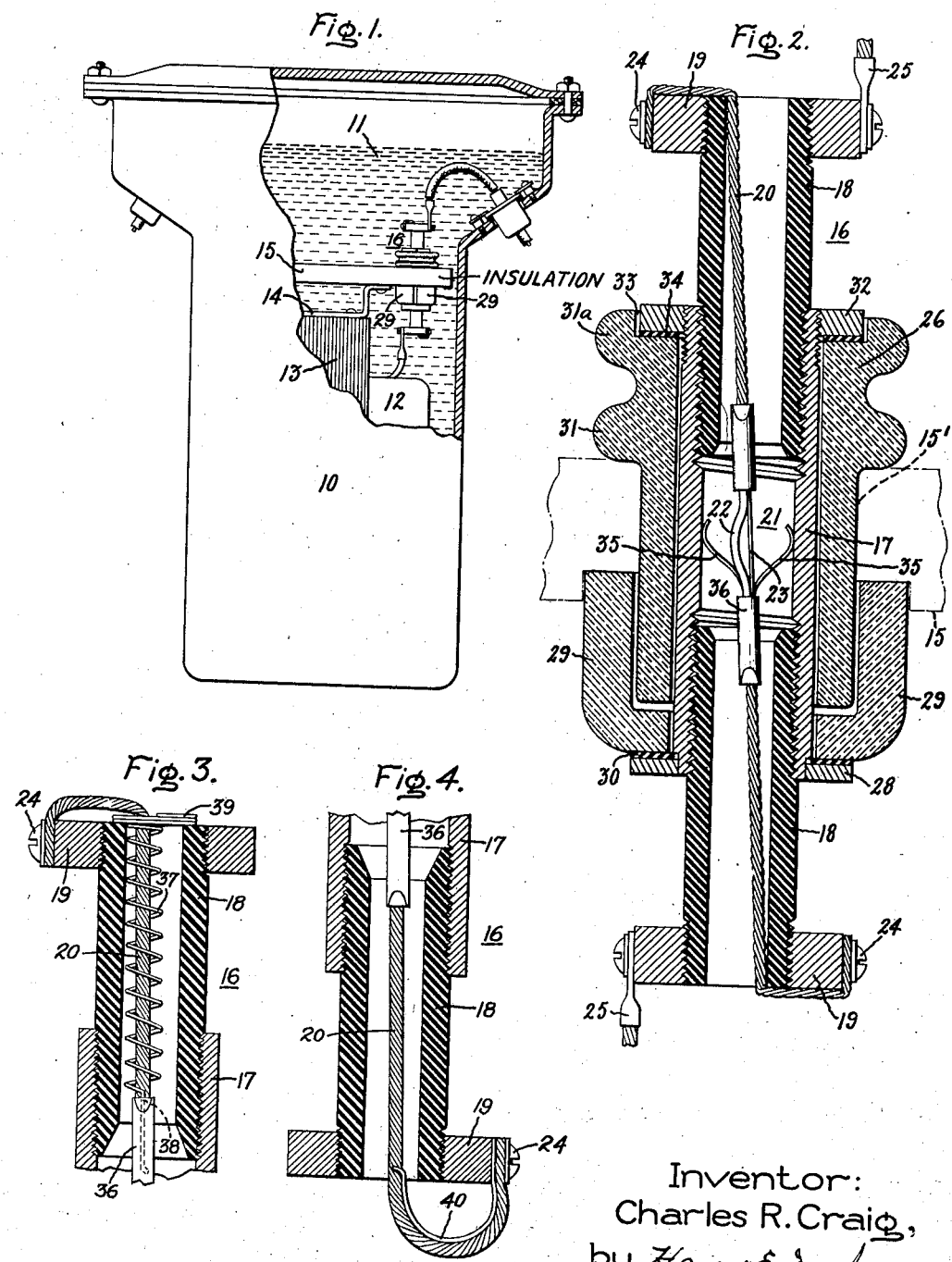
Inventor:
Charles R. Craig,
by Harry E. Dunham
His Attorney.

Patented Dec. 28, 1943

2,337,872

UNITED STATES PATENT OFFICE 2,337,872

PROTECTIVE DEVICE

Charles R. Craig, Pittsfield, Mass., assignor to General Electric Company, a corporation of New York Application October 14, 1941, Serial No. 414,918

15 Claims. (Cl. 200—120)

My invention relates to a protective device and more particularly to a fused protective device for protecting electrical apparatus, such as transformers and the like, of the liquid insulation filled type where the fused protective device is mounted within the casing of the electrical apparatus. Specifically my invention is an improvement on United States Letters Patent 2,223,232, granted November 26, 1940, upon an application of S. R. Smith, and assigned to the same assignee as the present application.

It is an object of my invention to provide a new and improved fused protective device for electrical apparatus which has greater interrupting capacity than similar devices used heretofore.

It is another object of my invention to provide an improved fuse device and mounting therefor.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a partial sectional view of one application of my invention to an electrical apparatus, such as a transformer, Fig. 2 is an enlarged sectional view of the fused protective device shown as applied to the transformer in Fig. 1, and Figs. 3 and 4 are partial sectional views of modifications of my invention.

Although my invention may be employed in the protection of forms of electrical apparatus other than transformers, such, for example, as capacitors where similar problems may be encountered, I have elected for the purpose of describing and illustrating my invention to show it as applied to the protection of an electric translating apparatus, such as a transformer.

In Fig. 1 of the drawing, 10 designates an electric translating apparatus, such as a transformer, the casing of which is partially cut away to show the internal assembly. It should be understood that the particular construction of the transformer has no bearing upon the present invention and is merely schematically shown for the purpose of illustrating my invention. The interior of the transformer tank or casing is preferably filled or substantially filled with a suitable insulating liquid 11, such as oil or a liquid halogenated hydrocarbon composition, such as is described and claimed in United States Letters Patent 1,931,373, granted upon an application of F. M. Clark, and assigned to the same assignee as the present application. Immersed in the insulating liquid are the transformer windings generally indicated at 12, the transformer core 13, and a core-clamping framework 14. Fuse devices of the present invention are particularly adapted to be supported within the transformer tank, submerged or at least partially submerged in the body of liquid dielectric and connected in series with the leads of the transformer. Although Fig. 1 shows only one of the fuse devices connected in one of the high-voltage leads, a plurality of devices may, if desired, be so connected where taps or series-parallel connections are employed.

In transformer constructions made heretofore, the core-clamping structure or framework 14 often supports an insulating member or support of some sort, such as 15 in Fig. 1, which is particularly adapted to support the fuse device of the present invention.

This fuse device, best shown in Fig. 2, comprises a tubular casing generally indicated at 16 including a central section 17 of a material which will withstand high pressures, such as steel or the like. In order to provide insulated ends for casing 16, I provide substantially identical tubular members 18 of insulating material which have a considerably smaller volume than the central casing section 17 and which are adapted to be threaded into the ends of central section 17. Preferably, the end sections 18 are formed of an insulating material which evolves gas when subjected to the heat of an electric arc, or if desired, they may be formed of a suitable insulating material lined with a gas-evolving material.

Threaded on each end of tubular casing 16 is a terminal nut 19 of good conducting material. A suitable conductor 20 including a short fusible section generally indicated at 21 is mounted within tubular casing 16. The fusible section preferably comprises a fusible link 22 and a strain wire 23.

In order to position the short fusible section 21 of conductor 20 within the central section 17 of relatively large volume of tubular casing 16 and also so that the fusible section is positioned substantially at the longitudinal axis of tubular casing 16, the conductor 20 is electrically connected to the terminal nuts 19 at each end of tubular casing 16 as at 24, the terminals for the conductor being located at opposite sides of the casing so that conductor 20 runs diagonally through tubular casing 16 and that the short fusible section 21 thereof is substantially at the longitudinal axis of tubular casing 16. Electrical connections with the fuse device may be readily made to terminal nuts 19 as shown at 25. Preferably, these connections are made diametrically opposite the connections 19 and, as best shown in Fig. 1, for this arrangement, the electrical connections to the fuse device do not interfere in any way with the expulsion of gases from the open ends of tubular casing 16 and, furthermore, these connections may be completed without disturbing the fusible element. Conversely, the fuse link comprising conductors 20 and fusible section 21 may be changed, if desired, without disturbing the external connections to the fuse device.

The fuse device having tubular casing 16 is preferably completely submerged in the body of dielectric 11 as shown in Fig. 1, although in certain applications, it may be desirable to submerge the device only partly in the body of liquid dielectric. In this manner, the central section 17 of tubular casing 16 adjacent fusible link 21 provides a fairly large volume of liquid dielectric to cool the arc which forms upon rupture of the fusible element.

In order to support the fuse device having tubular casing 16 in the submerged position indicated in Fig. 1, an insulating collar or cylinder 26 is provided which fits closely around central section 17 but which slides freely thereon. Also a metallic annular ring 28 is welded or brazed or fastened in some other suitable manner to the lower portion of the central section 17 of tubular casing 16. The fuse unit then is inserted in an opening 15' in insulating support 15 and a plurality of interfitting parts, such as a pair of semicylindrical cooperating members 29, are arranged around the portion of the fuse device extending below insulating support 15 and above annular ring 28. These semicylindrical members cooperate to form a cup-shaped member when assembled. A suitable resilient gasket 30 is provided between the semicylindrical members 29 and annular ring 28 since the cup-shaped members are preferably formed of a ceramic insulating material or the like. The insulating cylinder 26 is provided with an enlarged annular ring 31 to prevent the fuse device from falling through the opening 15' in insulating support 15 and the fuse device is firmly attached to insulating support 15 by tightening a nut 32 threadedly mounted on the upper end of the central section 17 of tubular casing 16. This annular nut 32 is adapted to fit into a recess 33 in insulating cylinder 26 and, since the latter is preferably formed of a ceramic insulating material, a suitable insulating packing material 34 is provided to protect the ceramic material. The fuse device with the exception of members 29 is adapted to be inserted through opening 15' in support 15 until enlarged annular ring 31 engages with the upper edge of opening 15'. Nut 32 is unscrewed from section 17 so as to allow the device to be slipped downward sufficiently below support 15 to permit the insertion of the semicylindrical cooperating members 29. Thereafter, tightening of nut 32 will cause insulating support 15 to be clamped between the enlargement 31 and semicylindrical cooperating members 29 so that connections to the transformer windings and terminals may readily be made as best shown in Fig. 1. In order to increase the electrical potential creepage distance of the fuse device of my invention additional annular enlargements, such as 31a, may be provided.

By constructing tubular casing 16 so that it is open at both ends as indicated in Fig. 2, several distinct advantageous results are obtained thereby. In the first place, the reactive forces exerted on supporting member 15 upon rupture of the fuse device are very small since the fact that expulsion in opposite directions from the point of beginning of arc interruption will tend to equalize these reacting forces. Furthermore, this double expulsion action will allow a more rapid lengthening of the arc path, thereby reducing the pressure developed in the insulating liquid.

In the event that this fuse device is used on high-voltage installations, considerable radio interference might result due to the fact that central section 17 of tubular casing 16 is not at the same electrical potential as that of the fusible section 21 thereof, and there is a possibility of high-frequency discharges between these two portions of the fuse device. In order to eliminate any possibility of such high-frequency discharges, I maintain central section 17 at the same potential as that of the fusible sections 21 by providing a plurality of spring conducting wires 35 which are swaged in one of the terminals 36 of the fusible section 21 so as to pass readily through the length of tubular casing 16 but, when positioned as shown in Fig. 2, will press against opposite walls of central section 17, thereby bringing it to the same electrical potential as that of fusible section 21. Upon rupture of the fusible section 21 and expulsion of the parts from casing 16, electrical contact with central section 17 is broken, thereby isolating section 17 electrically and increasing the insulation value of the fuse device after circuit interruption to the combined value of both insulating tubes 18 plus insulating cylinders 26 and 29.

For interrupting low currents particularly, the time of interruption may be decreased by means provided for initiating the separation of the fuse link terminals, thereby decreasing the overall time for interruption and, accordingly, in Fig. 3, I have illustrated a tension spring 37 having one end thereof 38 swaged into fusible section terminal 36 while the other end is provided with a few turns 39 of enlarged cross-section so as to be seated on one end of tubular casing 16. The other parts of the fuse device of Fig. 3 are identical with those of Fig. 2 and are designated by the same reference numerals. Coil spring 37 is normally under tension when the fuse link is mounted in tubular casing 16 so that, when the fusible section 21 melts, the terminal 36 to which the spring is swaged will be jerked out toward the open end of the tubular casing.

In Fig. 4 I have illustrated the lower portion of the fuse device of Fig. 2 in which a flat spring member 40 is fastened to terminal nut 19 as at 24 so as to flip the fuse link cable or conductor 20 out of the end of the tubular casing 16 upon rupture of the fusible section thereof. A flat spring, such as 40, could be used at either end of tubular casing 16 or one at each end might be provided.

From the above description, it will be obvious that I have provided a fuse device in which simple connection of the line leads may be made without disturbing the fuse connections in any manner. The fuse supporting means is very simple and permits ready removal and replacement of the device when desired. In addition to the advantages previously pointed out, the construction and arrangement described is characterized by extreme simplicity with very low cost and with a high circuit-interrupting capacity.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. The combination of an electric apparatus including an insulating support, a protective device comprising a conductor including a fusible section, a casing for said fusible section of said conductor constructed of a material strong enough to withstand high pressures, a sleeve of insulating material including an annular enlargement surrounding a portion of said casing, means defining an opening in said support, said opening being of such a size to receive said sleeve but insufficient to permit said annular enlargement to pass therethrough, a plurality of cooperating members for engaging said casing and said support after insertion of said device in said opening, and means for clamping said support between said annular enlargement and said cooperating members.

2. In an electric apparatus including an insulating support, a protective device comprising a conductor including a fusible section, a casing for said fusible section of said conductor, means defining an opening in said support through which a portion of said casing may be inserted, a plurality of interfitting parts for engaging said casing and said support after said casing has been inserted in said opening, means including said interfitting parts for fastening said device to said support, and a body of liquid dielectric in said electric apparatus, said casing having an opening therein for receiving said liquid dielectric, said conductor being so disposed in the casing that at least a portion of it is immersed in said liquid dielectric.

3. The combination of a protective device for electric apparatus of the type having a body of liquid insulating dielectric and including an insulating support, a tubular casing, means for mounting said tubular casing on said insulating support so as to be at least partially submerged in said body of dielectric, a conductor including a short central fusible section mounted in said casing, a pair of terminals for said conductor one at each end of said casing, said terminals being located at opposite sides of said casing, means for attaching the ends of said conductors to said terminals so that said conductor extends diagonally through said casing, and means for positively positioning said short fusible section substantially at the longitudinal axis of said casing.

4. In a fuse device, a tubular casing, a conductor including a sort central fusible section mounted in said casing, and means for positioning said fusible section in a predetermined manner in said tubular casing comprising a pair of terminals for said conductor one at each end of said casing, said terminals being located at opposite sides of said casing so that said conductor extends diagonally through said casing and means for positively positioning said short fusible section substantially at the longitudinal axis of said casing.

5. In a fuse device, a tubular casing comprising a central section of relatively large volume constructed of a material adapted to withstand high pressures and a pair of substantially identical insulating end sections of smaller diameter threadedly supported from said central section, a conductor including a short central fusible section mounted in said casing so that said fusible section is within said central section of said casing, and means for positively positioning said fusible section substantially at the longitudinal axis of said casing.

6. The combination of an electric apparatus including an insulating support, a protective device mounted on said support comprising a conductor including a short central fusible section, a tubular casing for said conductor comprising a central section constructed of a material adapted to withstand high pressures, a pair of substantially identical insulating end sections of smaller diameter than said central section threadedly supported from said central section, said conductor being mounted in said casing so that said fusible section is within the central section of said casing, and means for positively positioning said short fusible section substantially at the longitudinal axis of said casing.

7. The combination of an electric apparatus of the type including a body of liquid dielectric, an insulating support, a protective device having a tubular casing comprising a central section of relatively large volume and a pair of substantially identical end sections of relatively smaller volume threadedly supported from said central section, means for mounting said tubular casing on said insulating support so that said central section is at least partially submerged in said body of dielectric, a conductor including a short central fusible section mounted in said casing so that said fusible section is within the central section of said casing, and means for positively positioning said fusible section substantially at the longitudinal axis of said casing.

8. The combination of an electric apparatus of the type having a body of liquid insulating dielectric and including an insulating support, a protective device comprising a conductor including a fusible section, a casing for said fusible section of said conductor, means defining an opening in said support through which a portion of said casing may be inserted, a plurality of interfitting parts for engaging said casing and said support after said casing has been inserted in said opening, and means including said interfitting parts for fastening said device to said support so that said tubular casing is at least partially submerged in said body of liquid dielectric, said casing being open at both ends so that expulsion of gases therefrom upon blowing of said fusible section will occur in two directions to permit a more rapid lengthening of the arc path and to maintain the pressure increase in said body of liquid insulating dielectric at a minimum.

9. The combination of an electric apparatus of the type having a body of liquid insulating dielectric and including an insulating support, a protective device comprising a conductor including a fusible section, a casing for said fusible section of said conductor, means defining an opening in said support through which a portion of said casing may be inserted, a plurality of interfitting parts for engaging said casing and said support after said casing has been inserted in said opening, and means including said interfitting parts for fastening said device to said support so that said tubular casing is at least partially submerged in said body of liquid dielectric, said casing being open at both ends to permit expulsion of gases from both ends so that the reactive forces on said support upon blowing of said fusible section substantially neutralize each other.

10. The combination of an electric apparatus including an insulating support and a body of liquid insulating dielectric, a protective device comprising a conductor including a fusible section, a casing for said fusible section of said conductor constructed of a material strong enough to withstand high pressures, a sleeve of insulating material including an annular enlargement surrounding a portion of said casing, means defining an opening in said support, said opening being of such a size to receive said sleeve but insufficient to permit said annular enlargement to pass therethrough, a plurality of interfitting parts including a pair of semicylindrical cooperating members for engaging said casing and said support after insertion of said device in said opening, and means for clamping said support between said annular enlargement and said cooperating members so that said casing is at least partially submerged in said liquid dielectric, said casing being open at both ends to permit expulsion of gases from both ends so that the reactive forces on said support upon blowing of said fusible section substantially neutralize each other.

11. The combination of an electric apparatus of the type having a body of liquid insulating dielectric and including an insulating support, a protective device comprising a conductor including a fusible section, a casing for said fusible section of said conductor, means for positioning the fusible section of said conductor at the longitudinal axis of said casing, means defining an opening in said support through which a portion of said casing may be inserted, a plurality of interfitting parts for engaging said casing and said support after said casing has been inserted in said opening, and means including said interfitting parts for fastening said device to said support so that said tubular casing is at least partially submerged in said body of liquid dielectric, said casing being open at both ends to permit expulsion of gases from both ends so that the reactive forces on said support upon blowing of said fusible section substantially neutralize each other.

12. In a fuse device, a tubular casing comprising a central section constructed of a material adapted to withstand high pressures and a pair of insulating end sections supported from said central section, a conductor including a short fusible section mounted in said casing so that said fusible section is within said central section of said casing, and means for maintaining said central section at the same potential as that of said conductor during the unblown condition of said fuse device to prevent high-frequency discharges therebetween and consequent radio disturbance.

13. In a fuse device, a tubular casing comprising a central section constructed of a material adapted to withstand high pressures and a pair of insulating end sections supported from said central section, a conductor including a short fusible section mounted in said casing so that said fusible section is within said central section of said casing, and means for maintaining said central section at the same potential as that of said conductor during the unblown condition of said fuse device comprising a spring wire connected to said conductor and biased into disengageable electrical contact with said central section so that said spring wire is blown out of said casing upon blowing of said fuse device and said central section is electrically isolated by said insulating end sections.

14. The combination of an electric apparatus including an insulating support, a protective device comprising a conductor including a fusible section, a casing for said fusible section of said conductor constructed of a material strong enough to withstand high pressures, a sleeve of insulating material including an annular enlargement surrounding a portion of said casing, means defining an opening in said support, said opening being of such a size to receive said sleeve but insufficient to permit said annular enlargement to pass therethrough, a plurality of interfitting parts including a pair of semicylindrical insulating members adapted to form a cup-shaped member for engaging said casing and said support after insertion of said device in said opening, and means for clamping said support between said annular enlargement and said insulating members.

15. The combination of a protective device for electric apparatus of the type having a body of liquid insulating dielectric and including a support, a tubular casing, detachable insulating means for mounting said casing on said support so as to be at least partially submerged in said body of dielectric, a renewable conductor including a short central fusible section mounted in said casing, a pair of terminals for said conductor one at each end of said casing, said terminals being located at opposite sides of said casing, means for detachably attaching the ends of said conductor to said terminals, and means for positioning said short fusible section at the longitudinal axis of said casing.

CHARLES R. CRAIG.